United States Patent
Sorbo et al.

(10) Patent No.: US 6,870,110 B2
(45) Date of Patent: Mar. 22, 2005

(54) FLOAT SWITCH WITH PROTECTIVE BOOT

(75) Inventors: Charles J. Sorbo, Plainville, CT (US); David P. Curry, Bristol, CT (US); James B. Dockendorff, North Haven, CT (US); Thomas Peter Mathews, Plymouth, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 10/781,364

(22) Filed: Feb. 18, 2004

(65) Prior Publication Data

US 2004/0233063 A1 Nov. 25, 2004

Related U.S. Application Data

(60) Provisional application No. 60/448,690, filed on Feb. 18, 2003.

(51) Int. Cl.[7] ................................................ H01H 35/18
(52) U.S. Cl. .................. 200/84 R; 200/302.1
(58) Field of Search ............................ 200/84 R–84 C, 200/302.1; 73/305, 309, 317, 318, 322.5

(56) References Cited

U.S. PATENT DOCUMENTS

| | | | |
|---|---|---|---|
| 2,136,220 A | | 11/1938 | Shepherd |
| 2,470,630 A | | 5/1949 | Marcou |
| 2,588,667 A | | 3/1952 | Stutzman |
| 4,086,457 A | * | 4/1978 | Niedermeyer .............. 200/84 R |
| 4,539,270 A | * | 9/1985 | Mejia ........................... 73/317 |
| 4,754,108 A | * | 6/1988 | Akhter ..................... 200/84 R |
| 4,922,234 A | * | 5/1990 | Murphy ..................... 200/84 R |
| RE34,175 E | * | 2/1993 | Grimes et al. ............. 200/84 R |
| 5,824,980 A | * | 10/1998 | Sodergard ................. 200/84 R |

FOREIGN PATENT DOCUMENTS

| | | |
|---|---|---|
| DE | 2 246 557 | 9/1972 |
| DE | 297 07 097 | 4/1997 |
| DE | 101 12 266 | 3/2001 |
| GB | 1172127 | 11/1969 |
| JP | 10185659 | 7/1998 |

* cited by examiner

Primary Examiner—Michael A. Friedhofer
(74) Attorney, Agent, or Firm—Altera Law Group, LLP

(57) ABSTRACT

Disclosed herein is a fluid level float switch and protective boot therefore. The boot is adapted to engage a detent portion of the float switch in a secure watertight fashion. The boot is adapted to flexibly accommodate movement of the float within the boot in response to changes in the liquid level in the reservoir in one embodiment or to engage contacts in another. The boot has a wall engaging portion for providing watertight engagement with an interior wall of the reservoir. The boot has an accordion shaped stem portion to facilitate insertion of the float switch into the boot and to flexibly accommodate movement of the float within the boot in one embodiment, or a rigid portion attached to the flexible portion in another embodiment.

27 Claims, 6 Drawing Sheets

FLOAT SWITCH WITH PROTECTIVE BOOT

CROSS-REFERENCE TO RELATED APPLICATIONS

This is a Non-Provisional (Utility) patent application of provisional application Ser. No. 60/448,690 filed Feb. 18, 2003.

BACKGROUND OF THE INVENTION

1. Field of the Invention

The present invention relates to a fluid or liquid level float switch, and more particularly to a boot for covering and protecting the float switch.

2. Description of Related Art

Fluid or liquid level float switches are used to control a level or volume of liquid in a reservoir. When the liquid level falls below a predetermined minimum level, the float is pulled downwardly by gravity. When the float is pulled sufficiently down, the switch is engaged to signal that the water level is deficient in the reservoir. A liquid replenishment is initiated to fill the reservoir back to the desired level or volume. As the liquid level rises the float is lifted by a buoyant force resulting from the float's own buoyancy. When the float has risen sufficiently the switch is disengaged and a signal is sent to stop the inflow of liquid into the reservoir. The liquid level float system works well with pristine water that is free from particulate matter or contaminants.

However, the liquid level float system is known to suffer from disadvantages when debris, such as sand, wood chips, and other particulate or hazardous materials are present in the liquid. The debris interferes with the ability of the float switch to operate properly or may prevent the switch from operating at all. For example, when debris prevents the float from rising, thus inhibiting the disengagement of the switch, the liquid level will not stop, resulting in an overflow of the reservoir wasting liquid and potentially causing a hazardous situation. Alternatively, when the debris prevents the float from falling and engaging the switch, the liquid level will continue to fall until the reservoir becomes empty which could result in burning up a liquid pump used to pump the liquid out of the reservoir.

It can be seen that there is a need for a boot for covering and protecting a liquid level float switch to ensure that the float switch may work properly in the presence of liquid bearing contaminants or particulate matter. The present invention fulfills these and other needs, and addresses other deficiencies of prior art implementations.

SUMMARY OF THE INVENTION

To overcome the limitations in the prior art described above, and to overcome other limitations that will become apparent upon reading and understanding the present specification, the present invention discloses a boot for covering and protecting a liquid level float switch.

An apparatus in accordance with the principles of the present invention may include a boot for covering and protecting a liquid level float switch. The boot may include a resilient material having an interior volume adapted to receive and flexibly accommodate a movable float portion of the liquid level float switch therein. The boot may also include a connecting portion for connecting the boot to a corresponding attachment portion of the liquid level float switch. The boot may also include a compressible wall engaging portion for providing watertight engagement with an inner wall of a reservoir. The movable float portion of the liquid level float switch is adapted to pivot within the interior volume of the boot in response to changes in a liquid level in the reservoir.

A further embodiment of a switch includes a mountable shaft having an end adjacent a point of mounting and an end distant therefrom, a first fixed contact and as second movable contact, said second contact having a first fixed end and a second free end, said shaft including a stop element configured to engage said second free end when the switch is activated, said stop element being positioned such that said second contact can engage said first contact, but that after contact said second contact is constrained from applying further pressure against said first contact by said stop element. The further embodiment has a boot of flexible material having capable of completely covering said contacts and insulating them from fluid, said boot having a first flexible portion generally adjacent said mounting end of the shaft and a second substantially rigid portion generally adjacent said second contact, said second portion of said boot being capable of displacing sufficient fluid so that when the fluid level rises above said boot, it is caused to flex along said flexible portion and thereby cause said rigid portion to engage said second contact and drive it toward said first contact.

A further embodiment of a boot for a level detecting switch having a pair of electrical contacts mounted on a shaft attachable to a fixture has a fluid tight enclosure material capable of completely covering said contacts and insulating them from fluid, said boot having a first flexible portion surrounding said shaft at the fixture end and a second substantially rigid portion generally adjacent said contacts, said second portion of said boot being capable of displacing sufficient fluid so that when the fluid level rises above said boot, it is caused to flex along said flexible portion and thereby causes said rigid portion to engage at least one of said contact and drive it toward the other contact.

A further embodiment of a fluid level detecting switch has a rigid stem, capable of being attached within a fluid reservoir; a fixed electrical contact rigidly attached to the stem; a movable electrical contact rigidly attached to the stem at one end and movable at a point distant from said fixed end; said contacts being positioned so that they can change electrical state; a boot surrounding and in fluid tight engagement with said stem, said boot including a flexible portion; a rigid portion; and a float portion; said rigid portion including a boot contact point for engaging said movable contact, said boot contact point being flexibly attached to said flexible portion and attached to said float portion, so that when said float portion moves in response to changes in the fluid level, it will cause said boot contact point to engage said movable contact and thereby cause the contacts to change electrical state.

A further embodiment of a fluid level detecting switch has a rigid stem, capable of being attached within a fluid reservoir; a fixed electrical contact rigidly attached to the stem; a movable electrical contact rigidly attached to the stem at one end and movable at a point distant from said fixed end; a safety stop on said rigid stem for engaging said movable contact and for limiting pressure applied to said fixed contact through said movable contact; said contacts being positioned so that they will become electrically engaged with respect to each other just before said safety stop limits the engagement pressure therebetween; a boot surrounding and in fluid tight engagement with said stem, said boot including a flexible portion; a rigid portion; and a float portion; said rigid portion including a boot contact point for engaging said movable contact, said boot contact point being flexibly attached to said flexible portion and attached to said float portion, so that when said float portion moves in responses to changes in the fluid level, it will cause said boot contact point to engage said movable contact and thereby cause the contacts to be electrically engaged.

A further embodiment of a method of switching electric current flow in response to changing levels of fluid, has the steps of (a) enclosing electrical contacts within a fluid tight boot, (b) positioning a rigid part of the boot adjacent said contacts, (c) allowing the boot to rise or fall in response to fluid levels, so that said rigid part will come in to an out of contact with said contacts in response to fluid levels thereby changing the conductivity of the switch.

The foregoing objects, advantages and distinctions of the invention, among others, are obtained in a presently preferred construction that provides a boot for covering and protecting the liquid level float switch. These features and others may be inventions alone or in combination.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the illustrated embodiments, reference is made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention provides a boot for covering and protecting a liquid level float switch. In a first embodiment, the boot covers and protects a switch, without substantially relying on the rigidity of the boot. In a second embodiment, the rigidity of the boot is integral to the operation of the switch.

Figure 1:
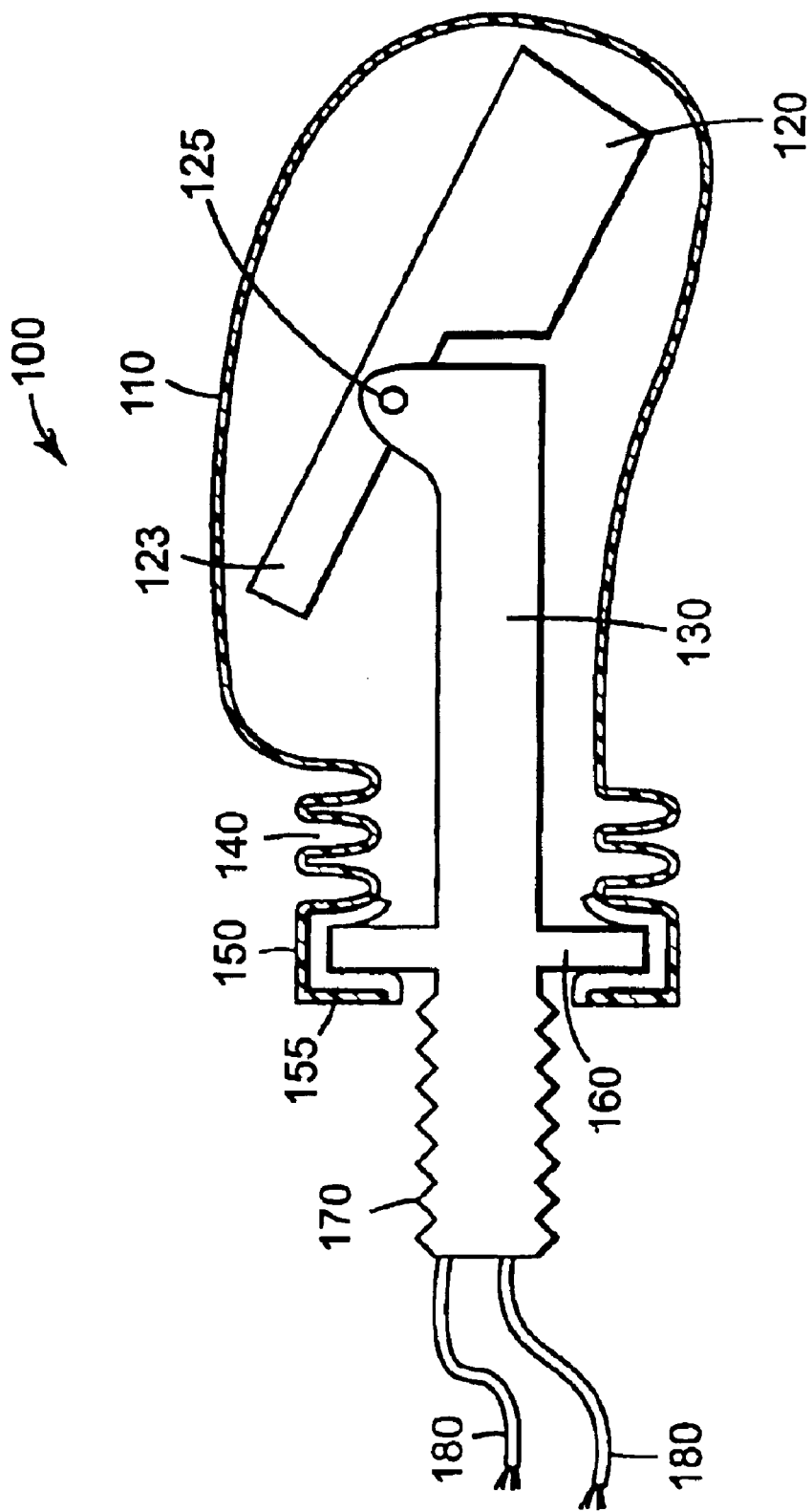
FIG. 1 illustrates a cutaway view of a liquid level float switch enveloped by a boot according to an embodiment of the present invention.

FIG. 1 illustrates a cutaway view of a fluid or liquid level detecting float switch 100 enveloped by a boot 110 according to a first embodiment of the present invention. In FIG. 1, a float switch 100 is shown having a float 120 adapted and configured to pivot about pivot point 125. The float 120 is disposed at one end of the float shaft 123. The float shaft 123 is pivotally connected to float switch arm 130 at pivot point 125. The float shaft 123 is adapted to pivot seesaw fashion as the float 120 is pulled downwardly by gravity or pushed upwardly by the buoyant force of the float 120 to engage and disengage an electrical contact (not shown).

The liquid level float switch 100 is adapted and configured for connection to a wall or other inner surface of a reservoir by threaded portion 170 extending from an end of the float switch arm 130 opposite the end having the float 120 disposed thereon. The threaded portion 170 may be threaded directly into a wall of the reservoir or may be received in a hole in the wall and fastened to the wall with a washer and nut combination. The float switch arm 130 may be hollow in order to permit wires 180 to extend from the electrical contact (not shown) actuatable by movement of the float 120. The float switch arm 130 is provided with a circular shaped detent 160 projecting perpendicularly from the longitudinal axis of the float switch arm 130. The detent 160 provides a surface for connection of boot 110 to the liquid level float switch 100.

Boot 110 is adapted and configured to be placed over and cover the portion of the float switch arm 130 having the float disposed thereon. The boot 110 is shown provided with a connecting cap portion 150 adapted and configured to securely engage the detent 160 of the liquid level float switch 100. The cap portion 150 and the detent 160 may each be provided with engaging portions such as threads, or the cap portion 150 may be frictionally connected to the detent 160. The boot 110 may also be secured to the liquid level float switch 100 by clamps or may be wired or tied thereto.

The boot 110 is also provided with an accordion shaped stem 140 that permits the boot 100 to be flexible enough to allow free movement of the float (i.e. not interfere with its free movement in response to fluid level changes) 120 within the boot 110. The stem 140 also facilitates connection of the boot 110 to the liquid level float switch 100. The boot 110 is also provided with a reservoir wall engaging portion 155 that is flexible enough to be compressed slightly and provide a frictional or tensioned watertight engagement with an interior wall of the reservoir. The boot may be fabricated from rubber, plastic or other flexible, watertight composite materials. Resiliency is also preferred.

Figure 2:
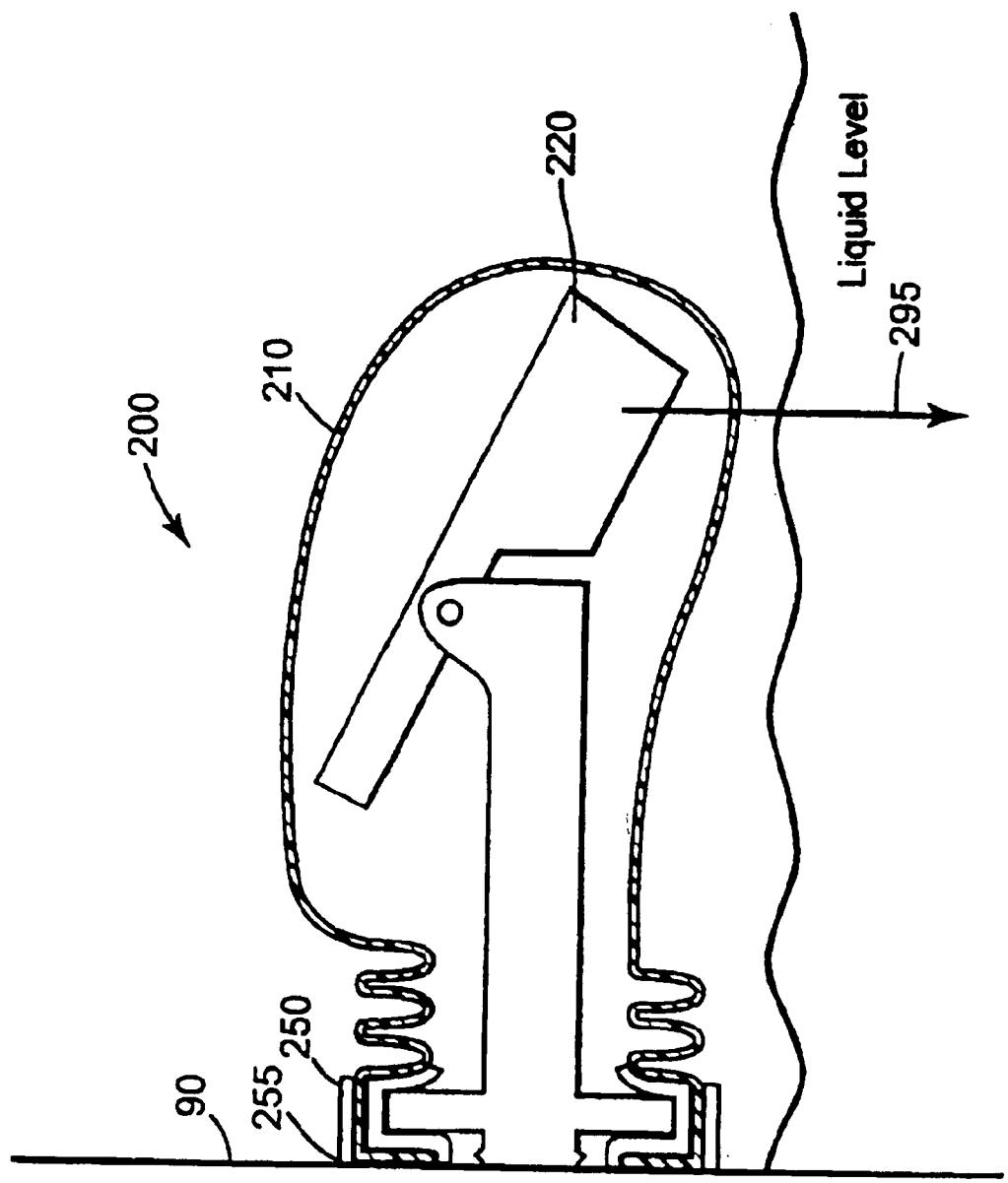
FIG. 2 illustrates a cutaway view of a liquid level float switch when a liquid level has fallen below the float switch according to an embodiment of the present invention.

FIG. 2 illustrates a cutaway view of a liquid level float switch 200 mounted in a reservoir when a liquid level has fallen below the float 220 according to an embodiment of the present invention. The float 220 is shown being pulled downwardly by gravity (see arrow) 295. The wall engaging portion 255 of the boot 210 is shown in watertight engagement with an inner wall 290 of the reservoir. The boot 210 is shown distended to accommodate the movement of the float 220. When the float 220 has been pulled down sufficiently the switch is engaged to initiate replace of the liquid removed from the reservoir and increase the liquid level.

Figure 3:
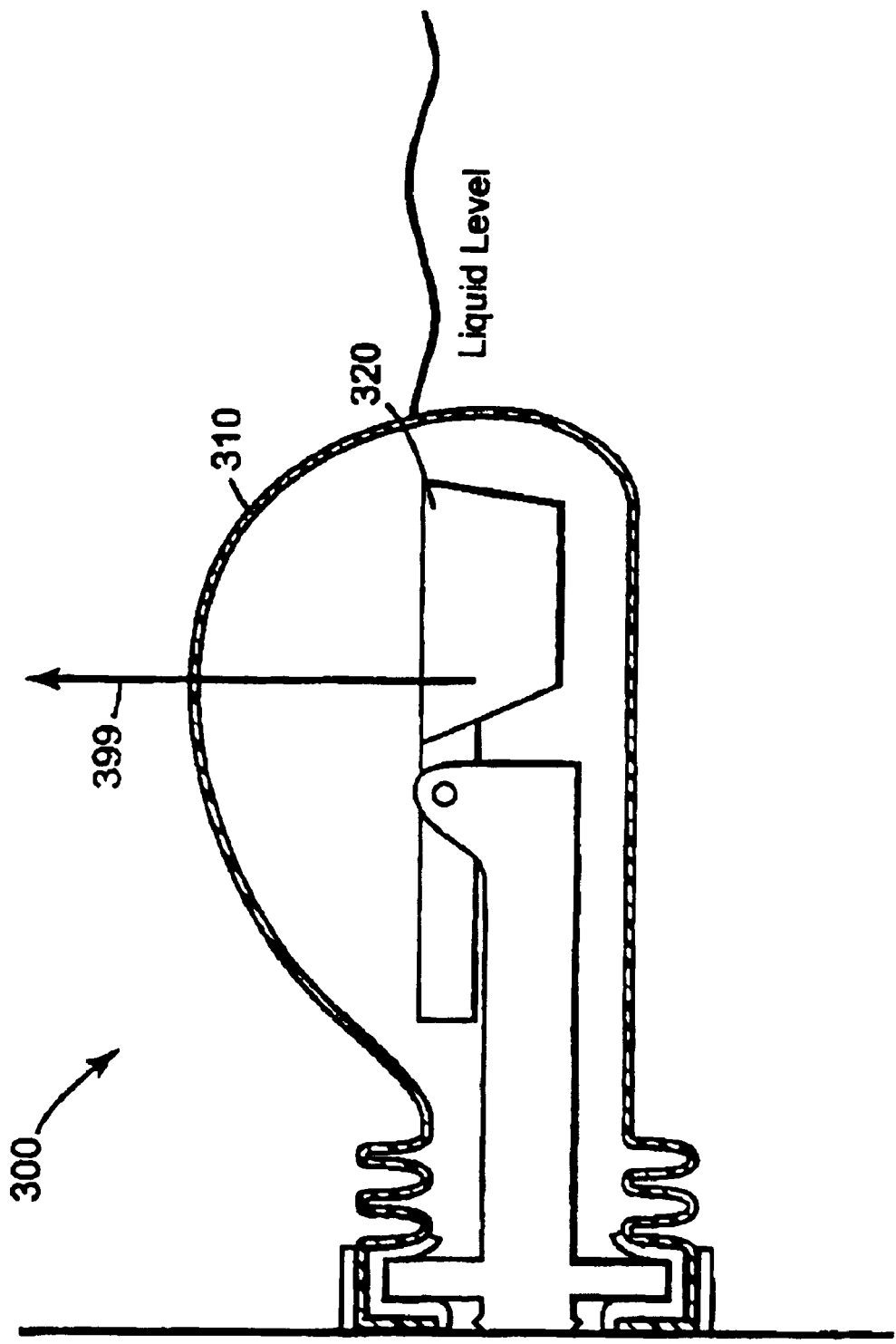
FIG. 3 illustrates a cutaway view of a liquid level float switch when a liquid level has risen sufficiently to raise the float according to an embodiment of the present invention.

FIG. 3 illustrates a cutaway view of a liquid level float switch 300 when a liquid level has risen sufficiently to raise the float 320 according to an embodiment of the present invention. The boot 310 shown distended to accommodate the movement and positioning of the float 320 in the raised position. The buoyant force (shown by arrow) 399 causes the float 320 to rise with the liquid level in the reservoir. When the float 320 has risen sufficiently the switch is disengaged and the inflow of replacement liquid ceases.

The liquid level float switch 300 may be connected to timing circuitry to cause liquid to flow into the reservoir for a predetermined amount of time when the switch is engaged. The liquid level float switch 300 may be connected to volume measuring circuitry to cause a predetermined volume of liquid to be pumped into the reservoir when the switch is engaged.

It is understood that alternate structures for the switch are applicable to this invention. It is only necessary that the boot be sufficiently flexible, that it not interfere with the free movement of the switch while still providing a fluid tight seal or protector.

Figure 4:
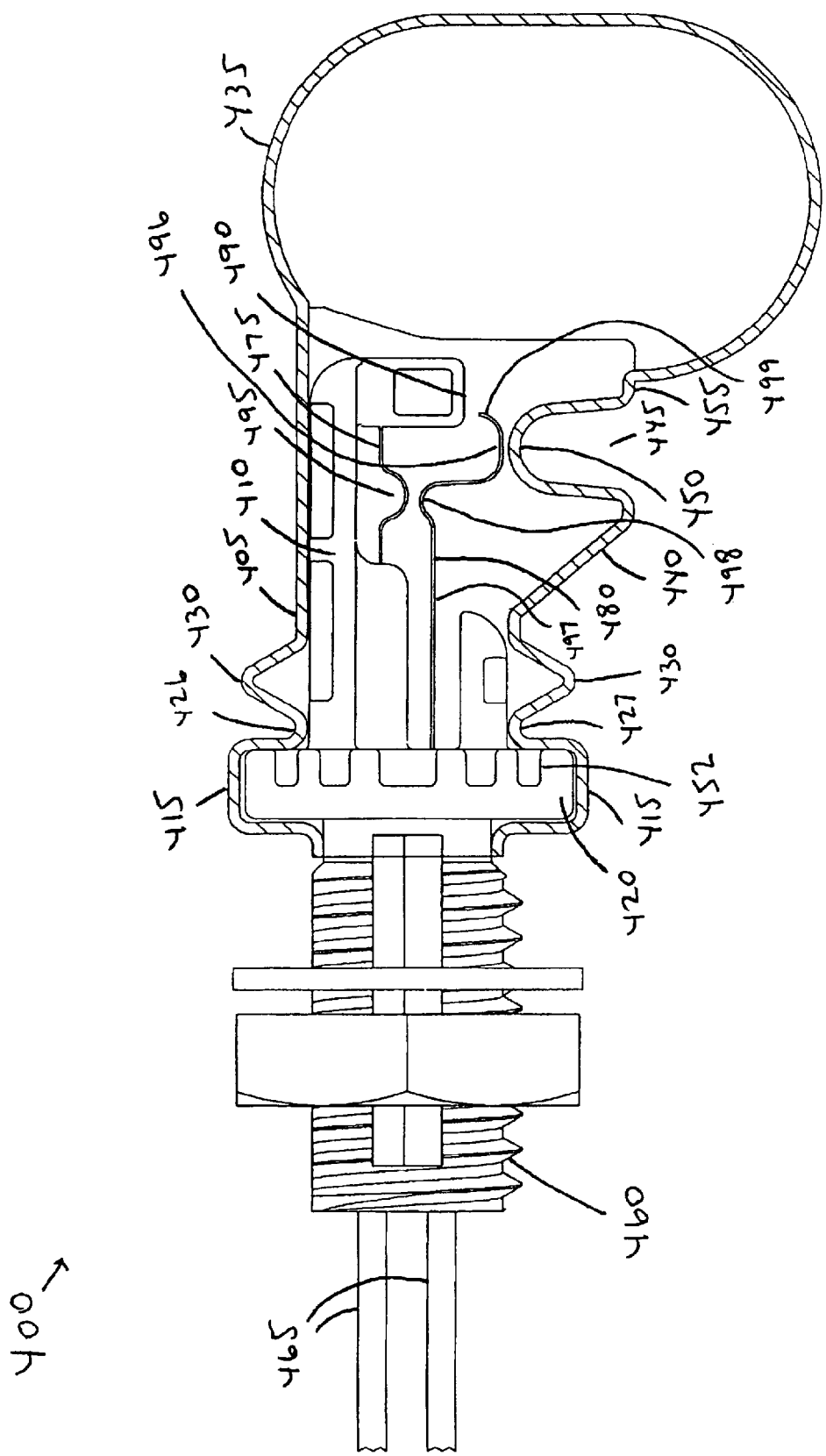
FIG. 4 illustrates a cutaway view of a liquid level float switch enveloped by a boot according to a further embodiment of the present invention.

A second embodiment of a level switch 400 with a protective boot is shown in FIG. 4. In this embodiment, the rigidity of the boot is integral to the operation of the switch. The switch is preferably manufactured as two discrete parts, then assembled, then sold and installed as a single unit. A flexible, watertight bulb 405 is attached to a rigid stem 410 that contains an electrical connection. Once assembled, the switch 400 is preferably attached to the wall of a liquid-containing tank. When the liquid level is low, the bulb 405 remains in a relaxed state, and the electrical connection is open. When the liquid level rises beyond a certain point, the bulb 405 flexes under the influence of a buoyant force, and closes an electrical connection. The bulb 405 has a flexible region (denoted by 426, 427 in FIG. 4) and an inflexible region (everything but 426 and 427). The switch 400 and its subcomponents are described in further detail below.

The bulb 405 is generally made from a flexible, watertight material, such as plastic or rubber. Preferably, the bulb 405 may be manufactured using the technique of blow-molding, which is commonly used to make plastic soda bottles. A preferable material with good chemical properties that is well-suited to blow-molding is a thermoplastic elastomer, such as Santaprene, which is commercially available from Monsanto. Typically, thermoplastic elastomers are blends of rubber and plastic, although other suitable materials may also be used to form the bulb 405.

The bulb 405 has a cap portion 415 that engages a detent 420 on the stem 410, and preferably forms a watertight seal when engaged. Both the detent 420 and the cap portion 415 are preferably generally rotationally symmetric with respect to a longitudinal axis of the switch.

Adjacent to the cap portion 415 are flexure points 426 and 427, which are generally designed to flex when a buoyant force is applied to the bulb 405. The remainder of the bulb 405 is designed to remain generally rigid when forces are applied. During normal operation of the switch, the only deformations of the bulb 405 preferably occur at the flexure points 426 and 427. Note that the flexure points are generally rotationally symmetric about the longitudinal axis of the switch 400, and may be referred to as a flexure ring. The flexure ring permits flexure in any direction perpendicular to the longitudinal axis of the switch 400, although motion in the horizontal direction (when the switch is installed) does not significantly affect operation of the switch 400. The flexure point does not need to be located at the end of the boot. There must be some point of flexure for the switch to be activated (i.e. change state from normally open to normally closed or vice versa).

Adjacent to the flexure points 426 and 427, on the opposite side of the cap portion 415, is a circular stiffness ridge 430, which remains generally rigid as the flexure points 426 and 427 deform. Starting at the flexure ring, the circular stiffness ridge 430 increases abruptly in diameter, then abruptly decreases back to roughly the diameter of the flexure ring. The resulting ridge has an increased stiffness due to a local increase in the wall thickness. Alternatively, the stiffness may be increased by a change in the nature of the material or its consistency. Alternatively, the local stiffness may be increased by adding corners into the local geometry. Preferably, the circular stiffness ridge 430 is rotationally symmetric with respect to a longitudinal axis of the switch.

Beyond the circular stiffness ridge 430, on the side opposite the flexure points 426 and 427, the bulb 405 generally serves two functions. First, the bulb 405 encloses a volume of air, so that when the liquid level rises above the bulb 405, the bulb 405 provides a buoyant force, resulting in a torque that deforms the flexure points 426 and 427. The shape of the bulb 405 is generally optimized to enclose as much volume as possible without interfering with the operation ongoing in the tank, and to generally locate as much of that volume as possible below the longitudinal axis of the switch. In this embodiment, more than one half of the volume of the bulb is below the axis. By maximizing the volume below the longitudinal axis, the activation point of the switch, i.e., the liquid level at which the electrical contact is closed, is kept as low as possible, which is desirable. Generally, the activation point is an important property of the switch, and is typically provided to the user as a published design specification. The activation point may be coincident with the longitudinal axis of the switch 400, and may preferably be lower. Additionally, the volume-enclosing portion of the bulb 405 may be located farthest away from the flexure points 426 and 427, so that the deforming torque may be maximized. Of course, it is possible that the bulb portion might be separated from the contact point 450 such as by a tethered float bulb.

The second function of the bulb 405 is to provide a force against a pair of electrical contacts once the liquid level rises beyond the activation point. It is found that the stiffness of the bulb wall itself may be insufficient to reliably provide the electrical contact force, so several stiffening features are incorporated into the shape of the bulb 405. Between the circular stiffness ridge 430 and the volume-enclosing portion 435, there is an angled ledge 440 adjacent to a cylindrical notch 445. Both the angled ledge 440 and the cylindrical notch 445 are designed to maximize the rigidity of the bulb 405. Notice that stiffness is achieved by having sidewalls converge at right angles. In the base of ledge 440, a triangular shape is created with great stiffness. Likewise on the other side of point 450 is horizontal ledge 450 creates, by intersection of orthogonal walls, areas of great stiffness which resist deformation. When the liquid level rises beyond the activation point, the flexure points 426 and 427 deform, and the top of the cylindrical notch 445 provides a force against a pair of electrical contacts. The top of the notch is therefore known as a boot contact point 450. Therefore, it is preferable that the cylindrical notch 445 and the bulb structure that supports it be as rigid as possible. It will be understood that various other stiffening features may be incorporated into the bulb 405, in addition to, or instead of the angled ledge 440 and the cylindrical notch 445 shown in FIG. 4. As described earlier, the bulb may be stiffened by other methods, such as increasing the wall thickness, changing the nature or consistency of the wall material, or using corners in the local geometry where stiffness is required.

It is instructive to explicitly describe the geometry used to stiffen the bulb 405, and we do so in great detail. At one end of the bulb 405 is the cap portion 415, which fits snugly over the detent 420 on the stem 410. Adjacent to the cap portion are the flexure points 426 and 427. When the liquid level rises beyond the activation point, the bulb rises under a buoyant force, and the flexure point 426 compresses while the flexure point 427 expands. Note that the flexure points are actually a full flexure ring, which extends nearly uniformly about the diameter of the bulb. In general, only the vertical motion of the bulb directly affects the performance of the switch 400, so we refer only to the top and bottom of the flexure ring, and label these points as flexure points 426 and 427. The flexure ring may be considered a single accordion pleat in the wall of the bulb 405. Beyond the flexure ring, the remainder of the bulb is designed primarily to remain rigid under the influence of buoyant forces and torques, and most of the remaining features on the bulb 405 are included to provide stiffness. We now describe these features in detail, sequentially moving away from the cap portion and the flexure ring. Adjacent to the flexure ring is a circular stiffness ridge 430. As we move away from the flexure ring, the diameter of the bulb increases abruptly, then decreases abruptly to return to roughly the diameter of the flexure ring. This increase and decrease in the bulb diameter forms the circular stiffness ridge 430. Adjacent (although not necessarily directly adjacent) to the circular stiffness ridge 430 is an angled ledge 440, where the lowermost wall of the bulb 405 protrudes downward at an angle. As we move away from the cap portion 415, we move farther downward along the angled ledge 440. Unlike the cap portion, the flexure ring, and the circular stiffness ridge 430, which are all generally rotationally symmetric about the longitudinal axis of the switch 400, the angled ledge 440 is generally flat. The angled ledge 440 comes to an abrupt edge, at which the lowermost wall of the bulb abruptly becomes nearly vertical, extending back toward the longitudinal axis of the bulb 405. This first vertical wall terminates in a nearly half-cylindrical notch 445, the top of which is brought into contact with the lower bare wire or contact 480 when the liquid level in the tank rises beyond the activation point. The top of the notch 445 is known as the boot contact point 450. The halfcylinder terminates in a second near-vertical wall, protruding roughly to the same extent as the angled ledge 440. The two near-vertical walls and the half-cylinder form the cylindrical notch 445. After the cylindrical notch 445, the wall extends horizontally (parallel to the longitudinal axis of the switch) as a horizontal ledge 455 until it intersects the wall of the volume-enclosing portion 435. The volume-enclosing portion 435 is roughly cylindrical, with roughly spherical caps at the top and bottom. There is significantly more volume below the longitudinal axis than above, so that the activation point may be as low as possible.

Although the shape of the bulb 405 may be designed for rigidity, the shape should also be manufacturable by the technique of blow-molding. Generally, the manufactured bulb 405 should not show any improper thickness variations throughout the part, which may be caused by blow-molding certain undesirable geometries. The design principles and constraints of blow-molding are well-known in the art, and are not reproduced here.

Because the bulb 405 is attached to the stem 410 prior to use, it is generally advantageous to provide an alignment feature for angular orientation between the two parts. This alignment feature minimizes the "clocking" error between the parts; in other words, it ensures that the 12-o'clock position of the bulb 405 aligns to the 12-o'clock position of the stem 410. The alignment feature is a slot denoted by 452 in FIG. 4, but alternatively may be a groove, a notch, a detent, or any other combination of these.

The bulb 405 is attached to the stem 410 by engaging the cap portion 415 of the bulb 405 to a detent on the stem 410, thereby forming a watertight seal. Once assembled, the bulb 405 and the stem 410 form a completed level switch 400, ready for sale and installation. The switch 400 may be attached to the wall of a tank by inserting the switch 400 through a pre-drilled hole of a specified diameter from the inside of the tank, so that the bulb 405 is located inside the tank and the threads 460 of the stem 410 are outside the tank, though the entire switch could be located in the tank on a support rod or the like. A washer and jam nut may then be screwed onto the stem threads 460 from the outside of the tank, compressing the cap portion 415 of the bulb 405 between the detent on the stem 410 and the inner wall of the tank, and thereby increasing the strength of the watertight seal.

The stem threads 460 may contain an alignment feature so that the switch installer may visually identify the orientation of the switch 460. For example, in FIG. 4, the threads 460 may be ground flat in the 12-o'clock orientation, and the switch installer knows to install the switch 400 so that the flat portion faces up. Various other identification techniques may be used, as well.

The stem 410 is made from a generally rigid material, preferably one that is easily moldable, and is compatible with wire that has a XLPVC jacket. A preferable material for the stem 410 is ABS, which is part of a family of terpolymers based on acrylonitrile butadiene and styrene technologies, and is commonly used to make telephones.

Because the stem 410 is preferably molded, it may contain some features that ensure that the part cools more uniformly after it is released from the mold. These features are generally called "coring", and they help make the wall thickness uniform at various locations on the stem 410, but do not substantially affect the strength or function of any parts. If the wall thickness is roughly uniform, the parts cool more uniformly, and the parts generally avoid warping as they cool.

The function of the switch 400 is to close an electrical connection when the liquid level rises above an activation point. As shown in FIG. 4, the stem 410 contains portions of an upper bare wire 475 and a lower bare wire/contact 480, brought into close proximity but spaced apart when the switch is in its relaxed state, and forced into contact at a contact point 495 when a force is applied by the boot. The wires 475 and 480 are preferably molded directly into the stem 410, which is more reliable and less expensive than inserting wires by hand. Near the contact point 495, the wires 475 and 480 may be bent toward each other in a shape that provides strength to the contact point 495, and ensures that there is generally only one point of contact along the length of the wires 475 and 480. As illustrated in FIG. 4, the stem 410 has an upper bare wire/contact 475, generally fixed in position, and a lower bare wire 480 that is movable, which may be brought into contact with the upper bare wire 475 by flexure of the boot.

The upper bare wire 475 may be preferably fixed at both ends by the stem 410. The lower bare wire 480 may generally be fixed only at one end, preferably the end nearest the wall of the tank. The lower bare wire 480 forms a cantilever spring, which is mechanically strong enough to support itself, yet easily flexible enough so that the bulb 405 can move it. A preferable material for the wires is phosphorous bronze, which is roughly 96% copper, 4% tin, and 0.2% phosphorous. Phosphorous bronze has a higher tensile strength than copper. Alternatively, any other suitable conductor may be used for the wires 475 and 480, such as copper or aluminum.

During the fabrication process, the upper and lower bare wires 475 and 480 are first cut to size and shaped, then are fastened to lengths of standard 18-gauge wire 465, typically by an autosplicer (similar to a crimp tool), then are inserted into the mold. The body of the stem 410 is then molded around the wires 465, 475, 480. Alternatively, the wires 465 may be inserted by hand through holes in the stem 410, but this is more expensive then molding the wires 465 directly into the stem 410. Also, other gauges of wire may be used, and other methods of fastening may be used, which are all well-known in the art.

Beyond the contact point 495, the lower bare wire 480 is bent back toward the upper bare wire or contact 475 with a radius comparable to that used at the contact point 495, then is terminated prior to contacting a safety stop 490, molded into the stem 410. When the wires 475 and 480 are just brought into contact by the boot, the end of the lower bare wire 480 is just spaced apart from the safety stop 490. The purpose of the safety stop 490 is to ensure that the wires 475 and 480 are not damaged or deformed if the stem 410 is handled roughly, or is grabbed near the contact point 495. Because the end of the lower bare wire 480 may be oriented roughly perpendicular to the safety stop 490, the wire may absorb shocks without damage much more readily than if a different configuration were used, say, if the end of the lower bare wire 480 were oriented parallel to the safety stop 490. Because of its shock absorbing properties, the tip of the lower bare wire 480 may be referred to as a shock absorbing tip 499 which is preferably a curved portion 496 and a contact tip which is configured to contact the safety stop 490. The tip configuration prevents deformation of the critical contact point 498 or 497 if too much pressure is applied at the stop point. The geometry of the safety stop 490 illustrated in FIG. 4 is exemplary, and other configurations may be used that prevent damage or deformation of the wires.

While a normally opened switch is shown, it could easily be configured as a normally closed version. The contact wire 475 would of course be in the mirror image position from where it is shown in the figures and contact wire 480 would also be a mirror image.

Figure 5:
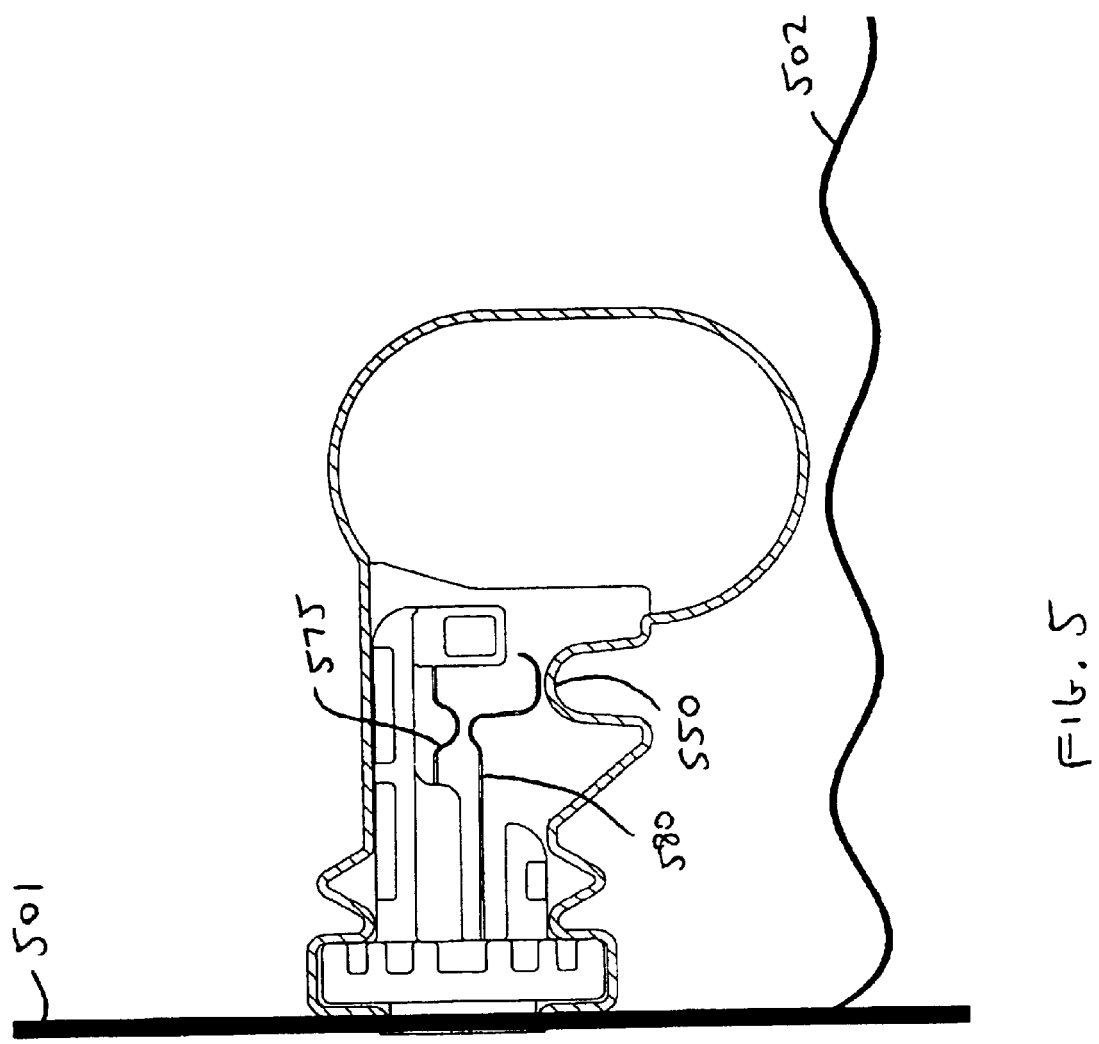
FIG. 5 illustrates a cutaway view of a liquid level float switch when a liquid level has fallen below the float switch according to a further embodiment of the present invention.

FIG. 5 shows a switch during normal operation, installed on the wall of a tank 501, where the level of the liquid 502 is below the activation point. The boot is relaxed, the boot contact point 550 does not force the upper bare wire 575 into contact with the lower bare wire 580, and the electrical circuit is open.

Figure 6:
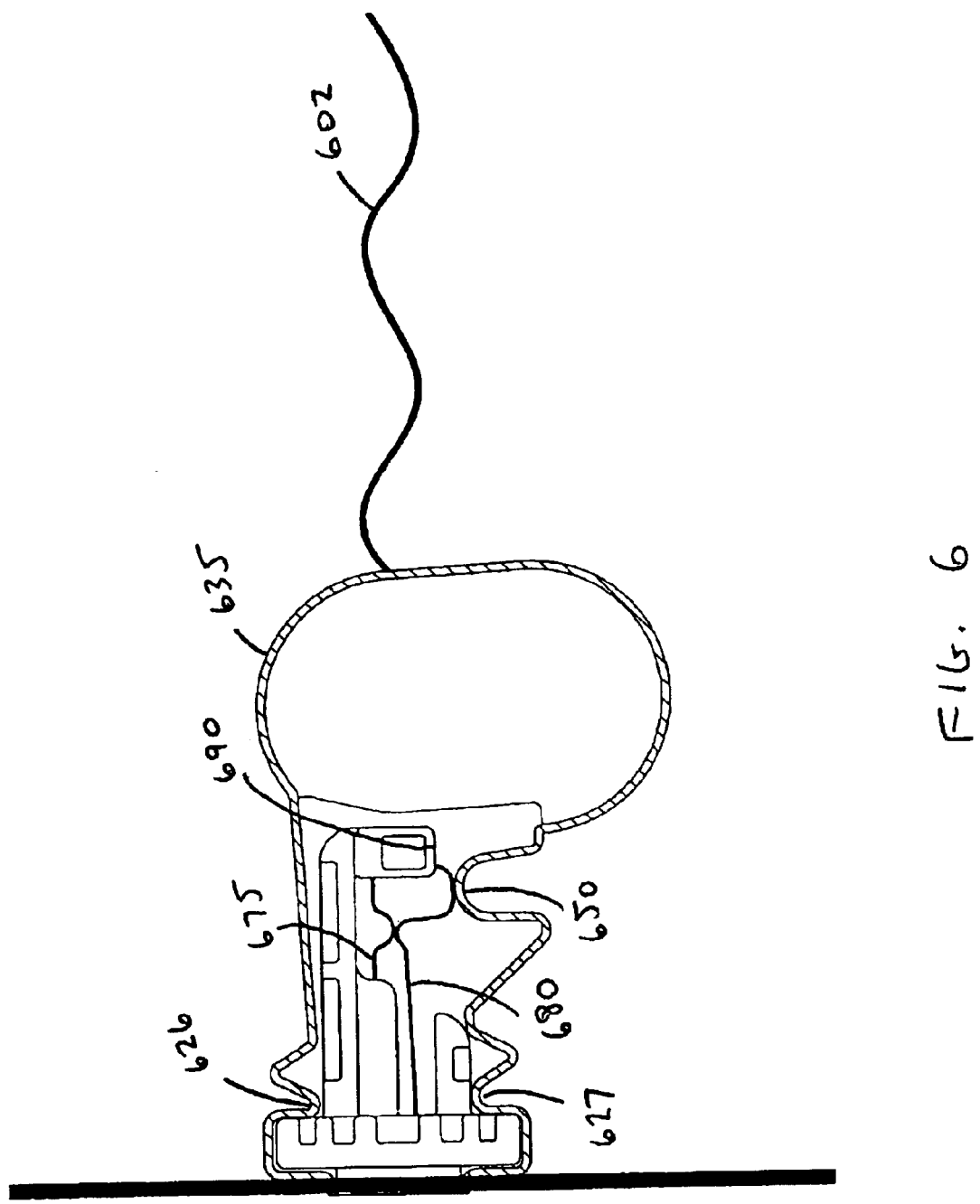
FIG. 6 illustrates a cutaway view of a liquid level float switch when a liquid level has risen sufficiently to raise the float according to a further embodiment of the present invention.

FIG. 6 shows a switch during normal operation, where the level of the liquid 502 is above the activation point. The volume-enclosing portion 635 experiences a buoyant force upward, the flexure point 626 compresses, the flexure point 627 expands, the boot contact point 650 presses against lower bare wire 680 and forces it into contact with the upper bare wire 675, and the electrical circuit is closed. The lower bare wire 680 is also forced against the safety stop 690, which prevents damage to the wires 675 and 680.

In the embodiment of FIGS. 4–6, the electrical circuit is open during the relaxed state, when the liquid level is below the activation point. Likewise, the electrical circuit becomes closed when the liquid level rises above the activation point. One may also configure the switch so that circuit is closed during the relaxed state, when the liquid level is below the activation point, and the circuit opens when the liquid level rises above the activation point. This alternate embodiment may be realized by fixing the lower bare wire at both ends, and allowing the upper bare wire to flexibly move. This embodiment is readily apparent to one skilled in the art, and is not drawn in the figures. In both embodiments, the electrical state of the switch is toggled when the liquid level rises above the activation point. In other words, when the liquid rises above the activation point, the switch either opens the circuit, or closes the circuit.

The foregoing description of the exemplary embodiment of the invention has been presented for the purpose of illustration and description. It is not intended to be exhaustive or to limit the invention to the precise form disclosed. Many modifications and variations are possible in light of the above teaching. It is intended that the scope of the invention be limited not with this detained description, but rather by the claims appended hereto.

What is claimed is:

1. A boot for covering and protecting a fluid level detecting switch, the boot comprising:
    a flexible material having an interior volume able to receive and flexibly accommodate a movable float portion of the switch therein;
    a connecting portion for connecting the boot to a corresponding attachment portion of the float switch; and
    an engaging portion for providing watertight engagement with an inner wall of a reservoir, wherein the movable float portion of the float switch is pivotable within the interior volume of the boot in response to changes in a liquid level in the reservoir.

2. The boot according to claim 1, further comprising an accordion shaped stem portion facilitating insertion of the float switch into the interior volume of the boot and accommodate movement of the movable float portion therein.

3. The boot according to claim 1, wherein the connecting portion of the boot cooperatively engages the attachment portion of the float switch.

4. The boot according to claim 1, wherein the boot comprises a flexible impermeable material selected from a group consisting of rubber, plastic, and composite materials.

5. A boot for covering and protecting a fluid level float switch, the float switch comprising:
    a float disposed at an end of a float shaft, the float shaft pivotable about a pivot point located at an end of a float switch arm, the float switch arm having a detent disposed proximate an opposite end from the pivot point, the float switch arm having connecting means for connecting the float switch to an interior wall of a reservoir; and the boot comprising:
    a resilient material having an interior volume able to flexibly accommodate the float switch arm therein;
    a connecting portion for connecting the boot to the detent on the float switch arm;
    a compressible wall engaging portion for providing watertight engagement with an inner wall of the reservoir, wherein the float is pivotable within the boot in response to changes in a liquid level in the reservoir.

6. The boot according to claim 5, further comprising an accordion shaped stem portion facilitating insertion of the float switch into the interior volume of the boot and accommodate movement of the float therein.

7. The boot according to claim 5, wherein the connecting portion of the boot cooperatively engages the detent on the float switch arm.

8. The boot according to claim 5, wherein the boot comprises a flexible material selected from a group consisting of rubber, plastic, and composite materials.

9. A combination fluid level float switch and boot for covering and protecting the float switch, the float switch comprising:
- a float disposed at an end of a float shaft, the float shaft pivotable about a pivot point located at an end of a float switch arm, the float switch arm having a detent disposed proximate an opposite end from the pivot point, the float switch arm having connecting means for connecting the float switch to an interior wall of a reservoir; and the boot comprising:
- a flexible material having an interior volume able to flexibly accommodate the float switch arm therein;
- a connecting portion for connecting the boot to the detent on the float switch arm;
- a compressible wall engaging portion for providing watertight engagement with the inner wall of the reservoir, wherein the float is pivotable within the boot in response to changes in a liquid level in the reservoir.

10. The combination float switch and boot according to claim 9, further comprising an accordion shaped stem portion facilitating insertion of the float switch into the interior volume of the boot and accommodate movement of the float therein.

11. The combination float switch and boot according to claim 9, wherein the connecting portion of the boot cooperatively engages the detent on the float switch arm.

12. The combination float switch and boot according to claim 9, wherein the boot comprises a flexible material selected from a group consisting of rubber, plastic, and composite materials.

13. The combination float switch and boot according to claim 9, wherein the connecting means for connecting the float switch to the inner wall of the reservoir is a threaded portion.

14. The combination float switch and boot according to claim 9, wherein downward movement of the float initiates replenishment of liquid within the reservoir.

15. The combination float switch and boot according to claim 9, wherein upward movement of the float cause inflow of liquid into the reservoir to cease.

16. The combination float switch and boot according to claim 9, wherein the float switch arm has a hollow orifice for directing electrical wires from within the interior volume of the boot to an exterior of the reservoir.

17. A fluid level detecting switch comprising:
- a switch including a mountable shaft having an end adjacent a point of mounting and an end distant therefrom, a first fixed contact and a second movable contact, said second contact having a first fixed end and a second free end, said shaft including a stop element configured to engage said second free end when the switch is activated, said stop element being positioned such that said second contact can engage said first contact, but that after contact said second contact is constrained from applying further pressure against said first contact by said stop element;
- a boot of flexible material capable of completely covering said contacts and insulating them from fluid, said boot having a first flexible portion generally adjacent said mounting end of the shaft and a second substantially rigid portion generally adjacent said second contact, said second portion of said boot being capable of displacing sufficient fluid so that when the fluid level rises above said boot, the boot is caused to flex along said flexible portion and thereby cause said rigid portion to engage said second contact and drive the second contact toward said first contact.

18. A switch according to claim 17 wherein said flexible portion of said boot includes a bellows and where in said rigid portion includes a pair of walls which intersect substantially orthogonally.

19. A switch according to claim 17 wherein said rigid portion includes a contact point, as viewed from the inside of the boot, said contact point being positioned, adjacent said second free end of said switch, so that when said boot is flexed, said contact point will engage said free end and drive the contacts into electrical engagement with each other.

20. A switch according to claim 17 wherein said rigid portion includes a bulbus portion and a contact portion both in rigid connection with each other.

21. A switch according to claim 17 wherein said second contact includes a shock absorbing element positioned adjacent said stop element and wherein said absorbing element is positioned to engage said stop element immediately after said first and second contact make electrical contract with each other.

22. A switch according to claim 21 wherein said shock absorbing element includes a curved portion and a tip, said tip being oriented to engage said stop element.

23. A switch according to claim 17 wherein said rigid portion is created in part by walls of the boot intersecting orthogonally on either side of said contact point.

24. A boot for a level detecting switch having a pair of electrical contacts mounted on a shaft attachable to a fixture comprising:
- a fluid tight enclosure material capable of completely covering said contacts and insulating them from fluid, said boot having a first flexible portion surrounding said shaft at the fixture end and a second substantially rigid portion generally adjacent said contacts, said second portion of said boot being capable of displacing sufficient fluid so that when the fluid level rises above said boot, the boot is caused to flex along said flexible portion and thereby causes said rigid portion to engage at least one of said contacts and drive the at least one of the contacts toward the other contact.

25. A fluid level detecting switch, comprising:
- a rigid stem, capable of being attached within a fluid reservoir;
- a fixed electrical contact rigidly attached to the stem;
- a movable electrical contact rigidly attached to the stem at one end and movable at a point distant from said fixed end;
- said contacts being positioned so that they can change electrical state;
- a boot surrounding and in fluid tight engagement with said stem, said boot including:
- a flexible portion;
- a rigid portion; and
- a float portion;
- said rigid portion including a boot contact point for engaging said movable contact, said boot contact point being flexibly attached to said flexible portion and attached to said float portion, so that when said float portion moves in response to changes in the fluid level, the float portion will cause said boot contact point to engage said movable contact and thereby cause the contacts to change electrical state.

26. A fluid level detecting switch, comprising:

a rigid stem, capable of being attached within a fluid reservoir;

a fixed electrical contact rigidly attached to the stem;

a movable electrical contact rigidly attached to the stem at one end and movable at a point distant from said fixed end;

a safety stop on said rigid stem for engaging said movable contact and for limiting pressure applied to said fixed contact through said movable contact;

said contacts being positioned so that they will become electrically engaged with respect to each other just before said safety stop limits the engagement pressure therebetween;

a boot surrounding and in fluid tight engagement with said stem, said boot including:

a flexible portion;

a rigid portion; and a float portion;

said rigid portion including a boot contact point for engaging said movable contact, said boot contact point being flexibly attached to said flexible portion and attached to said float portion, so that when said float portion moves in responses to changes in the fluid level, the float portion will cause said boot contact point to engage said movable contact and thereby cause the contacts to be electrically engaged.

27. A method of switching electric current flow in response to changing levels of fluid, comprising the steps of:

(a) enclosing electrical contacts within a fluid tight boot, (b) positioning a rigid part of the boot adjacent said contacts, (c) allowing the boot to rise or fall in response to fluid levels, so that said rigid part will come in to an out of contact with said contacts in response to fluid levels thereby changing the conductivity of the switch.

* * * * *